(12) United States Patent
Chiou

(10) Patent No.: US 6,988,118 B2
(45) Date of Patent: Jan. 17, 2006

(54) SYSTOLIC PRODUCT-SUM CALCULATOR OVER MULTI-BASIS IN GF(2M)

(75) Inventor: Rong-Liang Chiou, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 602 days.

(21) Appl. No.: 10/254,319

(22) Filed: Sep. 24, 2002

(65) Prior Publication Data
US 2003/0204546 A1  Oct. 30, 2003

(30) Foreign Application Priority Data
Apr. 26, 2002 (TW) .............................. 91108675 A

(51) Int. Cl.
*G06F 15/00* (2006.01)
(52) U.S. Cl. .................................................. 708/492
(58) Field of Classification Search ................ 708/491, 708/492; 714/784, 785
See application file for complete search history.

(56) References Cited

U.S. PATENT DOCUMENTS

| | | | |
|---|---|---|---|
| 5,046,037 A * | 9/1991 | Cognault et al. ........... | 708/492 |
| 5,524,090 A * | 6/1996 | Iwamura ..................... | 708/625 |
| 5,642,367 A * | 6/1997 | Kao ............................ | 714/784 |
| 5,689,452 A * | 11/1997 | Cameron .................... | 708/492 |
| 5,931,894 A * | 8/1999 | Wei ............................ | 708/492 |
| 6,687,725 B1 * | 2/2004 | Chen et al. ................. | 708/492 |

OTHER PUBLICATIONS

1."Systolic Multipliers for Finite Fields GF($2^m$)", IEEE Transaction on Computers, vol. C-33, No. 4, Apr. 1984.

* cited by examiner

*Primary Examiner*—Chuong D Ngo

(57) ABSTRACT

A systolic product-sum calculator for computing A*B+C over multi-basis in Galois fields GF($2^m$) includes a systolic architecture comprises a plurality of basic cells arranged in m rows and m columns, at least one row of n multiplexers disposed between two pre-determined rows, n and n-1, and a column of stacked multiplexers. At least one selection line is used to control the multiplexers for selecting the outputs over multi-basis including at least GF($2^m$) or GF($2^n$).

10 Claims, 5 Drawing Sheets

SYSTOLIC PRODUCT-SUM CALCULATOR OVER MULTI-BASIS IN GF(2M)

FIELD OF THE INVENTION

This invention relates to a device for arithmetic computing over multi-basis in Galois fields $GF(2^m)$, and more specifically to a systolic architecture that allows the computation over multi-basis in Galois fields $GF(2^m)$ with a single product-sum calculator.

BACKGROUND OF THE INVENTION

Finite or Galois fields (GF) are widely used in many applications, including error-correcting codes, switching theory, and digital signal processing. For example, the Reed-Solomon (RS) error-correcting codes utilize the finite field $GF(2^m)$ of $2^m$ elements, where m is a positive integer. These applications usually require to perform the arithmetic operations, which are different from the usual binary arithmetic operations, for the field $GF(2^m)$.

Because of their frequent computations, many hardware devices have been implemented to handle the arithmetic operations in hope to compute more efficiently. The systolic architecture, due to its simplicity and regularity, has been successfully used for such a VLSI implementation. The implementation allows simultaneous multiplication and addition operations without a look-up table for the elements of $GF(2^m)$. A look-up table is costly when m is large. However, the prior designs are unable to handle computations over dual-basis in Galois fields with a single calculator. An application that requires computing Galois fields over dual-basis needs two distinct product-sum calculators, and thus may double the gate count in the VLSI implementation.

A parallel-in, parallel-out systolic architecture for product-sum computation $A*B+C$ in the Galois field $GF(2^m)$ was developed by C. -S. Yea et al. in an article titled "Systolic Multipliers for Finite Fields $GF(2^m)$", pp. 357–360, VOL. C33, NO. 4, April 1984 of the IEEE Transactions on Computers. Although the proposed architecture was simple and regular enough for VLSI implementation, it can only compute over a singular basis. For applications that utilize dual-basis Galois fields, a VLSI design requires two product-sum calculators to accomplish the computation. This results in a higher gate count and a larger circuitry area, thus a higher manufacture cost.

SUMMARY OF THE INVENTION

The present invention has been made to overcome the above-mentioned drawback of the conventional systolic architecture for product-sum computation in Galois field $GF(2^m)$. Based on the conventional design, the present invention provides an improved systolic architecture so that applications utilizing multi-basis Galois fields can compute the arithmetic operations with a single product-sum calculator.

Accordingly, the systolic architecture of this invention comprises a plurality of basic cells arranged in m rows and m columns. A row of n multiplexers are disposed between two predetermined rows n and n-1 to couple the basic cells between the two rows. A column of m multiplexers are used to select outputs for different basis of Galois fields and a selection line is used to control the multiplexers. The present invention can compute $A*B+C$ over either $GF(2^m)$ or $GF(2^n)$, wherein 1<n<m. Therefore, with a single product-sum calculator, applications can perform arithmetic operations over dual-basis in Galois fields.

The invention can also compute $A*B+C$ over multi-basis of Galois fields such as $GF(2^m)$, $GF(2^n)$ or $GF(2^k)$, where 1<k<n<m, by disposing another row of k multiplexers between two predetermined rows k and k-1 to couple the basic cells between the two rows. A column of m stacked multiplexers are used to select outputs for different basis of Galois fields and a plurality of selection lines are used to control the multiplexers. Consequently, with a single product-sum calculator, applications can perform arithmetic operations over multi-basis in Galois fields.

The present invention will become more obvious from the following description when taken in connection with the accompanying drawings which show, for purposes of illustration only, a preferred embodiment in accordance with the present invention.

DETAILED DESCRIPTION OF THE INVENTION

Figure 1:
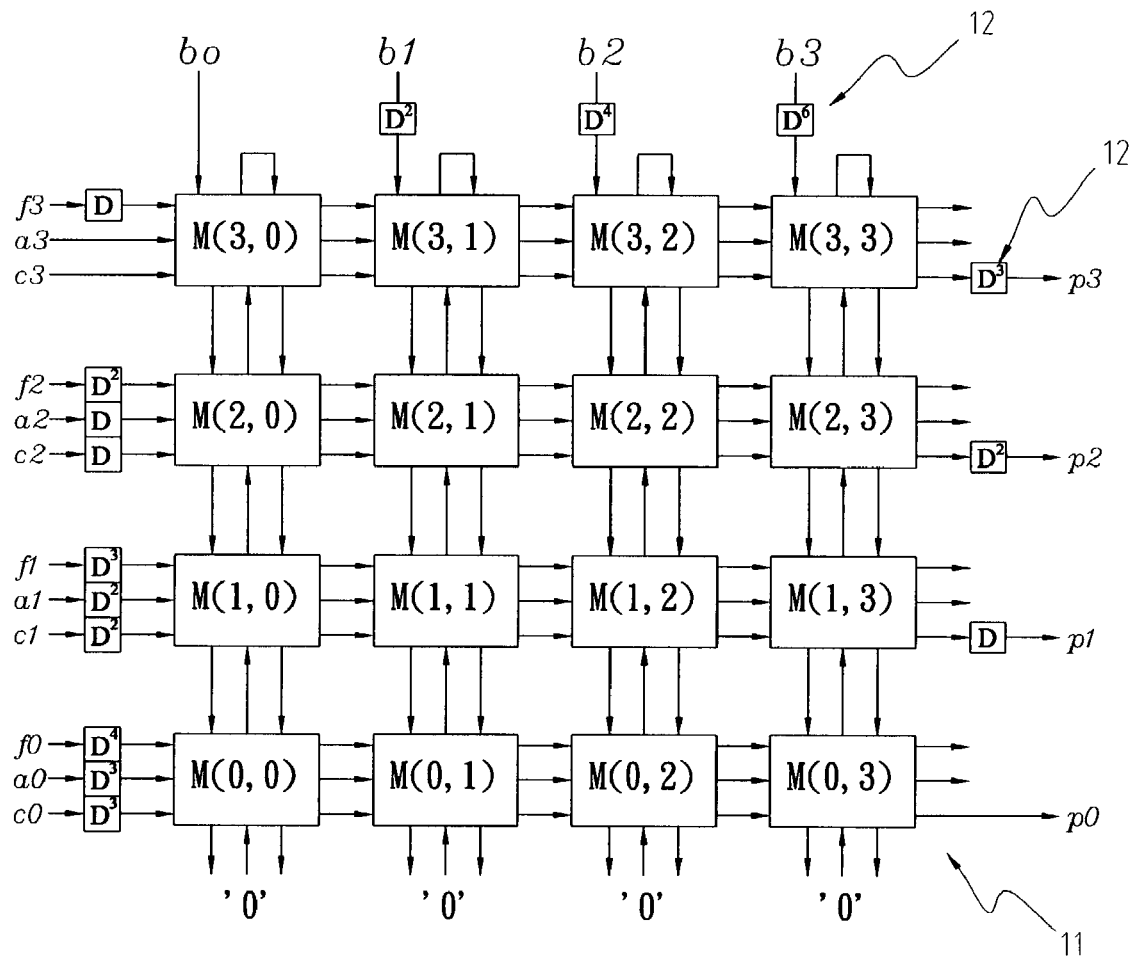
FIG. 1 is a parallel-in, parallel-out systolic architecture for product-sum computation $A*B+C$ in the Galois field $GF(2^4)$, published by Yea, et al.

A Galois field is an algebraic field that has a finite number of elements. The number of the elements is always in the form of $q^m$ elements, where q is a prime integer and m is a positive integer. Galois fields are widely used in error-correcting codes, switching theory, and digital signal processing. For example, the Reed-Solomon (RS) error-correcting codes utilize the Galois fields, and are used in diverse applications ranging from deep-space communication to digital audio disk systems.

The Galois field $GF(2^m)$ is an extended field of $GF(2)$, where $GF(2)$ is called a prime field of two elements, $\{0,1\}$. The Galois field $GF(2^m)$ contains $2^m$ elements, $\{0, 1, \ldots, 2^m-1\}$. All arithmetic operations in the prime field $GF(2)$ is the same as arithmetic modulo 2, while arithmetic operations in the extended fields $GF(2^m)$ are more complicated. The nonzero elements of $GF(2^m)$ are generated by a primitive element $\alpha$, where $\alpha$ is a root of a primitive irreducible polynomial $f(x)=x^m+f_{m-1}x^{m-1}+\ldots+f_1x+f_0$ over $GF(2^m)$. For instance, $f(x)=x^4+x+1$ and $f(x)=x^3+x+1$ are primitive irreducible polynomials over $GF(2^4)$ and $GF(2^3)$, respectively.

The nonzero elements of $GF(2^m)$ can be represented in the power of $\alpha$, i.e., $GF(2^m)=\{0, \alpha, \alpha^2, \ldots, \alpha^{2^m-2}, \alpha^{2^m-1}\}$ where $\alpha^{2^m-1}=1$. Since $\alpha$ is a root of the primitive irreducible polynomial f, i.e., $f(\alpha)=0$, thus $\alpha^m=f_{m-1}\alpha^{m-1}+\ldots+f_1\alpha+f_0$, where $f_i=\{0,1\}$ for $0 \leq i \leq m-1$. Therefore, each element of $GF(2^m)$ can also be represented in a polynomial of $\alpha$ with a degree less than m, i.e., $GF(2^m)=\{g_{m-1}\alpha^{m-1}+\ldots+g_1\alpha+g_0\}$ where $g_i=\{0,1\}$ for $0 \leq i \leq m-1$. The addition and the multiplication of any two elements of $GF(2^m)$ are performed as follows.

Assume A and B are two elements of $GF(2^m)$. Let $A=a_{m-1}\alpha^{m-1}+\ldots+a_1\alpha+a_0$ and $B=b_{m-1}\alpha^{m-1}+\ldots+b_1\alpha+b_0$. Then the sum $S=A+B=s_{m-1}\alpha^{m-1}+\ldots+s_1\alpha+s_0$, where $s_i=a_i\oplus b_i$ for $0\leq i\leq m-1$ and $\oplus$ is exclusive-OR operator. Let $Y=y_{m-1}\alpha^{m-1}+\ldots+y_1\alpha+y_0$ be the product of A and B. Then:

$$Y = A \times B = Ab_0 + (A\alpha)b_1 + \ldots + (A\alpha^{m-1})b_{m-1} \quad (1)$$

$$= \sum_{i=0}^{m-1}(A\alpha^i)b_i = \sum_{i=0}^{m-1}\left(\sum_{j=0}^{m-1}a_j^{[i]}\alpha^j\right)b_i$$

$$= \sum_{j=0}^{m-1}\left(\sum_{i=0}^{m-1}a_j^{[i]}b_i\right)\alpha^j$$

where $a_j^{[i]}$ is the coefficient of $\alpha^j$ in $A\alpha^i$. From (1), one obtains:

$$y_j=a_j^{[0]}b_0+a_j^{[1]}b_1+\ldots+a_j^{[m-2]}b_{m-2}+a_j^{[m-1]}b_{m-1}.$$

Each $a_{j[i]}$ for $0\leq j\leq m-1$ is recursively derived as follows:

Initially, for $i=0$, $A\alpha^0=A$, i.e., $a_j^{[0]}=a_j$ for $0\leq j\leq m-1$. \quad (2)

For $1\leq i\leq m-1$, $$A\alpha^i = (A\alpha^{i-1})\alpha \quad (3)$$

$$= \left(\sum_{j=0}^{m-1}a_j^{[i-1]}\alpha^j\right)\alpha = \sum_{j=0}^{m-1}a_j^{[i-1]}\alpha^{j+1}$$

$$= a_{m-1}^{[i-1]}\alpha^m + \sum_{j=1}^{m-1}a_{j-1}^{[i-1]}\alpha^j$$

Since $\alpha^m=f_{m-1}\alpha^{m-1}+\ldots+f_1\alpha+f_0$, thus $$A\alpha^i = a_{m-1}^{[i-1]}f_0 + \sum_{j=1}^{m-1}(a_{m-1}^{[i-1]}f_j+a_{j-1}^{[i-1]})\alpha^j \quad (4)$$

Therefore, from (4)

$$a_j^{[i]} = \begin{cases} a_{m-1}^{[i-1]}f_0, & \text{for } j=0 \\ a_{m-1}^{[i-1]}f_j+a_{j-1}^{[i-1]}, & \text{for } 1\leq j\leq m-1 \end{cases} \quad (5)$$

Combining the product and sum operation described above together, one can derive $P=A*B+C$, where A, B, or C is an element of $GF(2^m)$. Therefore, the coefficient of $\alpha^j$ in P has the form of $$p_j = \left(\sum_{i=0}^{m-1}a_j^{[i]}b_i\right)+c_j.$$

FIG. 1 shows a diagram of a prior art published by C. -S. Yea et al. It is a parallel-in, parallel-out systolic architecture for product-sum computation $A*B+C$ in the Galois field $GF(2^m)$, where m=4. Elements A, B, and C are the inputs, and are of the form of $\{a_0, a_1, a_2, a_3\}$, $\{b_0, b_1, b_2, b_3\}$, and $\{c_0, c_1, c_2, c_3\}$, respectively. P is the product-sum, defined as $P=A*B+C$. M(u, v) 11 represents the basic cell for the arithmetic computation, and D 12 represents the delay device for the synchronization purpose.

Figure 2:
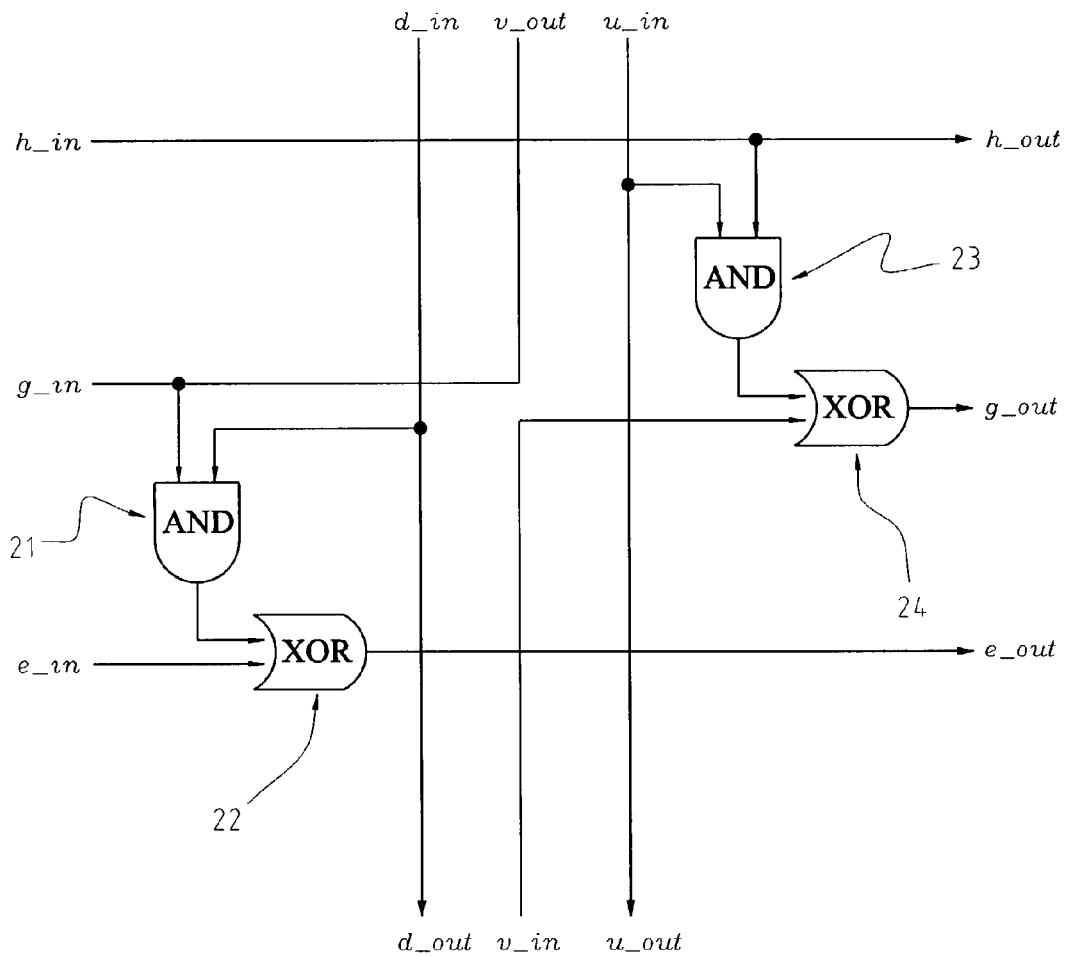
FIG. 2 is a diagram for a cell used in FIG. 1.

FIG. 2 shows the gate-level structure diagram of the basic cell M(u, v) 11 in FIG. 1. Each cell computes temporary value of the product-sum function as follows:

h_out=h_in;

d_out=d_in;

v_out=g_in;

u_out=u_in;

e_out=(g_in*d_in)⊕e_in; (AND gate 21, XOR gate 22)

g_out=(h_in*u_in)⊕v_in. (AND gate 23, XOR gate 24)

For simplicity, the delays are neglected in present discussion. Thus the initial inputs to the cells located on the first column and the first row in the systolic architecture are:

h_in=$f_j$;

g_in=$a_j$;

e_in=$c_j$;

d_in=$b_i$;

u_in=v_out.

Finally, the product-sum $P=A*B+C$ has the form $\{p_0, p_1, p_2, p_3\}$, where each $p_j$=e_out is the output of the cell located on the rightmost column.

Figure 3:
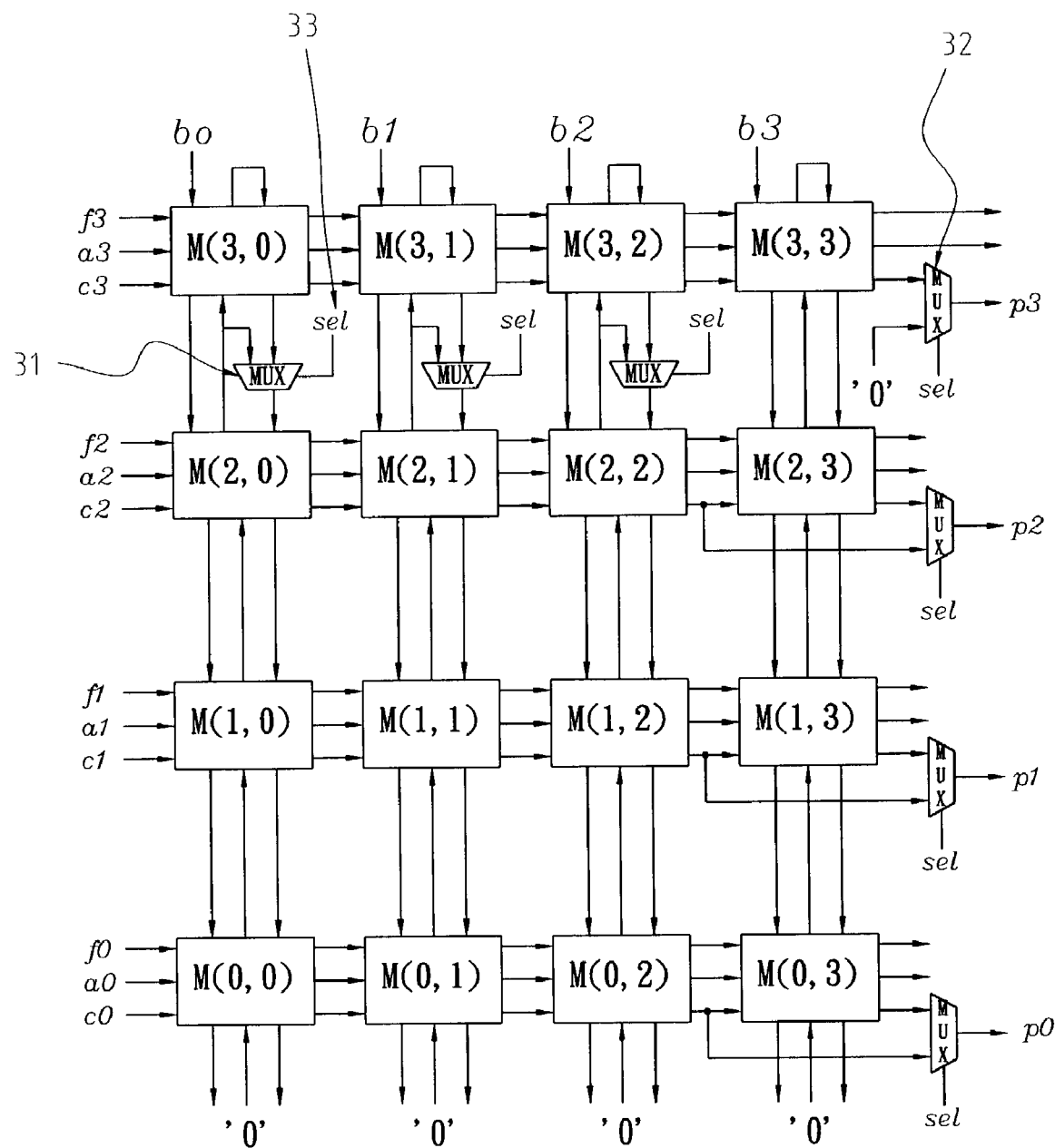
FIG. 3 is a diagram of an embodiment of the present invention for the systolic product-sum calculator over dual-basis between $GF(2^4)$ and $GF(2^3)$.

FIG. 3 shows the embodiment of the present invention for the systolic product-sum calculator over dual-basis between $GF(2^4)$ and $GF(2^3)$. For the simplicity of discussion, the delay devices 12 as shown in FIG. 1 are temporary neglected. In the present invention, an additional row of multiplexers(MUXs) 31 are built between the first and the second rows (subscript m-1, and m-2, respectively) to control the product-sum calculator for computing $A*B+C$ in either $GF(2^3)$ or $GF(2^4)$, and another column of MUXs 32 are used for selecting the output (subscript m-1, and m-2). A "sel" line 33 is used to control these MUXs 31, 32. As there are only two possibilities, i.e., m and n, a single bit is sufficient for the "sel" line 33 to determine whether the computation is in $GF(2^4)$, where the behavior resembles the architecture in FIG. 1; or the MUX chooses another input, thus resembling the behavior as in $GF(2^3)$.

Figure 4:
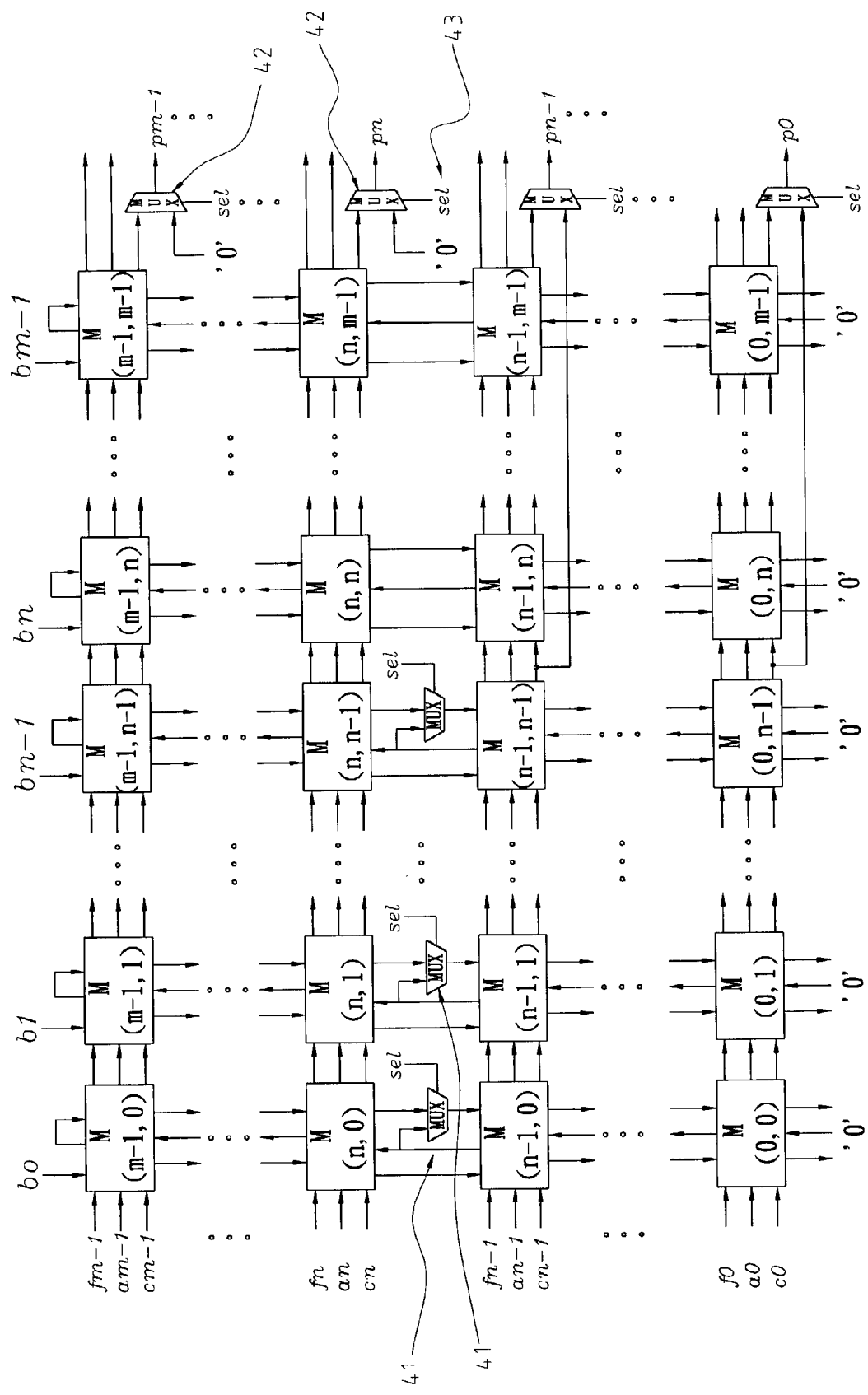
FIG. 4 is a diagram of an embodiment of the present invention for the systolic product-sum calculator over dual-basis between $GF(2^m)$ or $GF(2^n)$, where 1<n<m.

FIG. 4 shows an embodiment of the present invention for systolic product-sum calculator over dual-basis between $GF(2^m)$ or $GF(2^n)$, where 1<n<m. By placing the MUXs 41 between the rows with subscripts n and n-1, the present invention can choose to compute the product-sum in either $GF(2^m)$ or $GF(2^n)$, where 1<n<m and n is determined by the requirement of systems. Similarly, the column of the MUXs 42 are used to choose the outputs between the column with subscripts of m-1 and n-1. For instance, when the "sel" line 43 is enabled, the MUXs 41 would allow the output of the row n to propagate to row n-1, and the MUXs 42 select the column m-1 as the output. Therefore, the product-sum calculator behaves like computing over basis m. When the "sel" line 43 is disabled, the MUXs 41 would stop the propagation of row n to row n-1, and the MUXs 42 select the column n-1 as the output, thus computing over basis n. The values assigned to the "sel" would still work vice versa.

Figure 5:
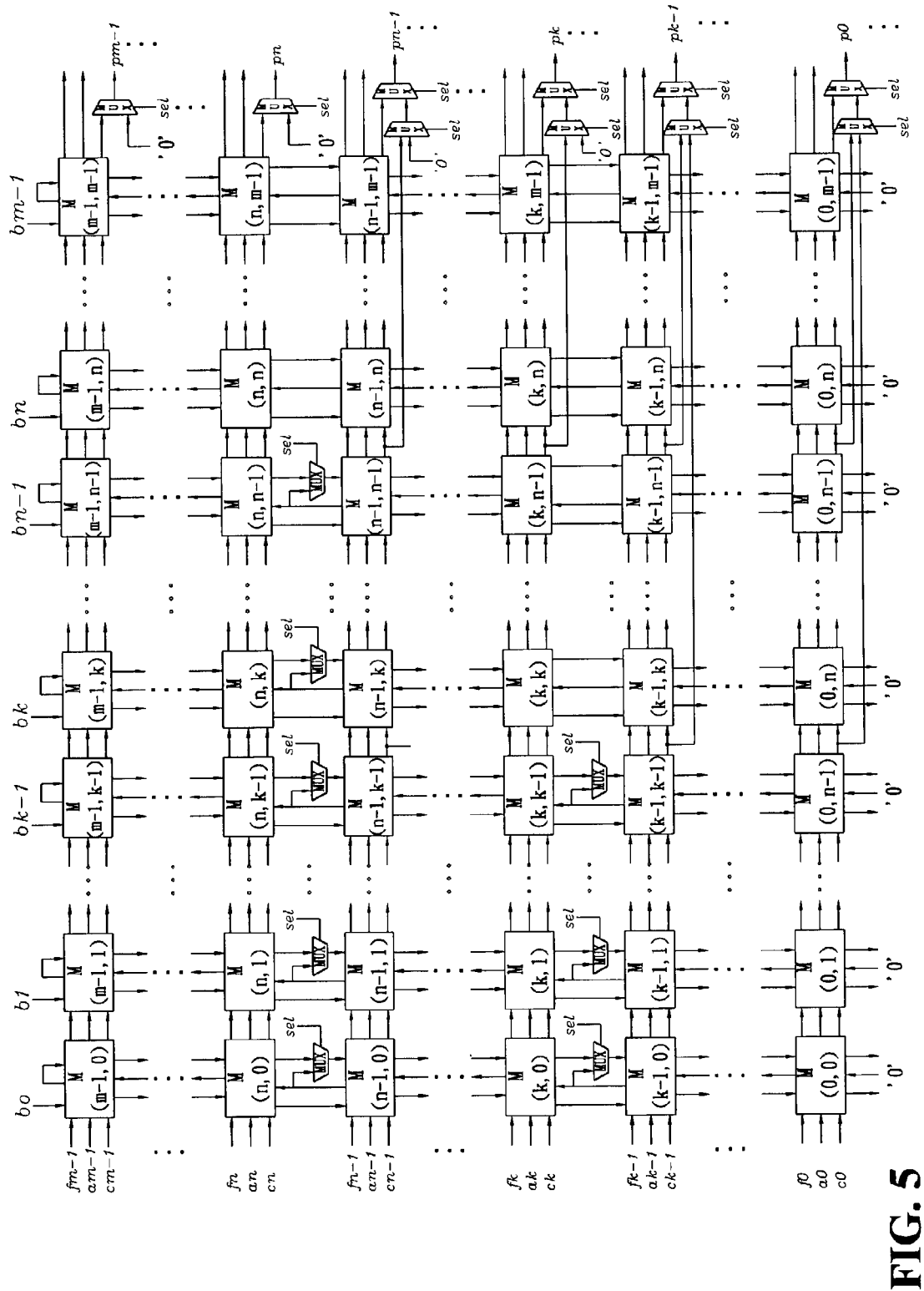
FIG. 5 is a diagram of an embodiment of the present invention for the systolic product-sum calculator over multi-basis between $GF(2^m)$, $GF(2^n)$ or $GF(2^k)$, where 1<k<n<m.

The present invention could further be enhanced to allow over multi-basis arithmetic computation in $GF(2^m)$. By placing the MUXs between any two selected rows, and use stacked MUXs, and multiple "sel" lines, the enhanced version of the present invention can compute the designated arithmetic operations over multi-basis. FIG. 5 illustrates a systolic architecture that can compute A*B+C over multi-basis of Galois fields such as $GF(2^m)$, $GF(2^n)$ or $GF(2^k)$, where 1<k<n<m, according to the present invention. As can be seen, a row of k multiplexers are placed between two rows k and k-1 in addition to the n multiplexers between rows n and n-1, and a column of stacked multiplexers are used to select outputs over multi-basis.

While only the preferred embodiments in accordance with the present invention are shown above, it should be clear to those skilled in the art that further embodiments may be made without departing from the scope of the present invention.

What is claimed is:

1. A systolic product-sum calculator over dual-basis in Galois fields, comprising:

a plurality of basic cells being arranged in a two dimensional array having row 0 to row m-1 and column 0 to column m-1 of basic cells;

a row of n multiplexers disposed between row n and row n-1 of said basic cells with 1<n<m;

a column of m multiplexers each being disposed in a row for selecting outputs over dual-basis $GF(2^m)$ or $GF(2^n)$; and a selection line controlling said row of n multiplexers and said column of m multiplexers for selecting outputs over $GF(2^m)$ or $GF(2^n)$.

2. The systolic product-sum calculator over dual-basis in Galois fields as claimed in claim 1, wherein each multiplexer of said row of n multiplexers has an associated column in column 0 to column n-1 of basic cells, and couples a basic cell in row n to a basic cell in row n-1 in said associated column.

3. The systolic product-sum calculator over dual-basis in Galois fields as claimed in claim 2, wherein each multiplexer of said row of n multiplexers couples a basic cell in row n to a basic cell in row n-1 by having a first input connected to one vertical output of the basic cell in row n, a second input connected to one vertical input of the basic cell in row n, and an output connected to one vertical input of the basic cell in row n-1.

4. The systolic product-sum calculator over dual-basis in Galois fields as claimed in claim 1, wherein each of said column of m multiplexers has an associated row of basic cells; selects an output of a basic cell located in column n-1 or an output of a basic cell located in column m-1 if said associated row is in row 0 to row n-1; and selects 0 or an output of a basic cell located in column m-1 if said associated row is in row n to row m-1.

5. A systolic product-sum calculator over multi-basis in Galois fields, comprising:

a plurality of basic cells being arranged in a two dimensional array having row 0 to row m-1 and column 0 to column m-1 of basic cells;

a row of n multiplexers disposed between row n and row n-1 of said basic cells with 1<n<m;

at least one row of k multiplexers disposed between row k and row k-1 of said basic cells with 1<k<n;

a column of m stacked multiplexers each being disposed in a row for selecting outputs over multi-basis including at least $GF(2^m)$, $GF(2^n)$ or $GF(2^k)$; and a plurality of selection lines controlling said row of n multiplexers, said at least one row of k multiplexers and said column of m stacked multiplexers for selecting outputs over multi-basis including at least $GF(2^m)$, $GF(2^n)$ or $GF(2^k)$.

6. The systolic product-sum calculator over multi-basis in Galois fields as claimed in claim 5, wherein each multiplexer of said row of n multiplexers has an associated column in column 0 to column n-1 of basic cells, and couples a basic cell in row n to a basic cell in row n-1 in said associated column.

7. The systolic product-sum calculator over multi-basis in Galois fields as claimed in claim 6, wherein each multiplexer of said row of n multiplexers couples a basic cell in row n to a basic cell in row n-1 by having a first input connected to one vertical output of the basic cell in row n, a second input connected to one vertical input of the basic cell in row n, and an output connected to one vertical input of the basic cell in row n-1.

8. The systolic product-sum calculator over multi-basis in Galois fields as claimed in claim 5, wherein each multiplexer of said at least one row of k multiplexers has an associated column in column 0 to column k-1 of basic cells, and couples a basic cell in row k to a basic cell in row k-1 in said associated column.

9. The systolic product-sum calculator over multi-basis in Galois fields as claimed in claim 8, wherein each multiplexer of said row of k multiplexers couples a basic cell in row k to a basic cell in row k-1 by having a first input connected to one vertical output of the basic cell in row k, a second input connected to one vertical input of the basic cell in row k, and an output connected to one vertical input of the basic cell in row k-1.

10. The systolic product-sum calculator over multi-basis in Galois fields as claimed in claim 5, wherein each of said column of m stacked multiplexers has an associated row of basic cells; selects an output of a basic cell located in column k-1, an output of a basic cell located in column n-1 or an output of a basic cell located in column m-1 if said associated row is in row 0 to row k-1; selects 0, an output of a basic cell located in column n-1, or an output of a basic cell located in column m-1 if said associated row is in row k to row n-1; and selects 0 or an output of a basic cell located in column m-1 if said associated row is in row n to row m-1.

* * * * *

UNITED STATES PATENT AND TRADEMARK OFFICE
CERTIFICATE OF CORRECTION

PATENT NO. : 6,988,118 B2 Page 1 of 1
APPLICATION NO. : 10/254319
DATED : January 17, 2006
INVENTOR(S) : Rong-Liang Chiou It is certified that error appears in the above-identified patent and that said Letters Patent is hereby corrected as shown below:

Title Page, item [73] Assignee: change "Industrial Technology Research Institute" to --Silicon Integrated Systems Corporation--.

Signed and Sealed this

Sixth Day of March, 2007

JON W. DUDAS
*Director of the United States Patent and Trademark Office*